(12) United States Patent
Snediker et al.

(10) Patent No.: US 11,753,255 B2
(45) Date of Patent: Sep. 12, 2023

(54) MOTORIZED DRY FOOD DISPENSING APPARATUS

(71) Applicant: Chicago Show, Inc., Buffalo Grove, IL (US)

(72) Inventors: James M. Snediker, Dowagiac, MI (US); Raymond J. Gradecki, Mundelein, IL (US)

(73) Assignee: CHICAGO SHOW, INC., Buffalo Grove, IL (US)

(*) Notice: Subject to any disclaimer, the term of this patent is extended or adjusted under 35 U.S.C. 154(b) by 0 days.

(21) Appl. No.: 17/326,924

(22) Filed: May 21, 2021

(65) Prior Publication Data

US 2021/0347583 A1 Nov. 11, 2021

Related U.S. Application Data

(63) Continuation-in-part of application No. 16/746,163, filed on Jan. 17, 2020, now Pat. No. 11,089,894.

(60) Provisional application No. 62/794,095, filed on Jan. 18, 2019.

(51) Int. Cl.
*B65G 47/84* (2006.01)

(52) U.S. Cl.
CPC ...... *B65G 47/84* (2013.01); *B65G 2203/0266* (2013.01)

(58) Field of Classification Search
CPC ......... B65G 47/84; G01F 11/24; G01F 11/20; B65D 83/0409
USPC ................. 222/368, 370; 141/362
See application file for complete search history.

(56) References Cited

U.S. PATENT DOCUMENTS

| 533,255 | A | | 1/1895 | Warner | |
|---|---|---|---|---|---|
| 930,736 | A | * | 8/1909 | Davis | G07F 11/44 222/360 |
| 1,022,774 | A | * | 4/1912 | De Julio | G01F 11/24 222/368 |
| 1,639,415 | A | * | 8/1927 | Poplawski | G01F 11/24 141/362 |
| 1,940,751 | A | * | 12/1933 | Hermani | G01F 11/24 222/248 |
| 1,966,326 | A | * | 7/1934 | Wentorf | G01F 11/24 222/360 |
| 1,974,316 | A | * | 9/1934 | Schoening | G01F 11/24 222/360 |

(Continued)

OTHER PUBLICATIONS

U.S. Appl. No. 16/746,163, filed Jan. 17, 2020.

*Primary Examiner* — Paul R Durand
*Assistant Examiner* — Michael J. Melaragno
(74) *Attorney, Agent, or Firm* — Barnes & Thornburg LLP

(57) ABSTRACT

The present invention provides a new motorized bulk, dry foods dispensing apparatus and system for commercial, retail and home use designed to dispense a predetermined volume of dry bulk food into a bowl or other receptacle without crushing or breaking the food. The bulk food dispenser includes a hopper, a feed house including two or more openings, and a feed wheel located within the feed house, where the feed wheel further includes a plurality of protrusions for directing a solid material out of the hopper when the feed wheel is rotated mechanically via a motor, where at least one of the two or more openings receive the solid material directed by a baffle, and where at least one of the two or more openings dispense the solid material out of the feed house.

16 Claims, 16 Drawing Sheets

(56) References Cited

U.S. PATENT DOCUMENTS

| | | | |
|---|---|---|---|
| 2,122,695 A | 7/1938 | Podwyszynski | |
| 2,315,244 A | 3/1943 | Campbell | |
| 2,315,473 A * | 3/1943 | Wolcott | G01F 11/24 141/340 |
| 2,330,256 A * | 9/1943 | Ashton | B65D 83/0409 221/265 |
| 2,446,582 A * | 8/1948 | Gopner | G01F 11/24 222/362 |
| 2,518,520 A | 8/1950 | Broun | |
| 2,575,967 A | 11/1951 | Edgar | |
| 2,584,781 A * | 2/1952 | Beatty | G01F 11/24 222/242 |
| 2,754,995 A * | 7/1956 | Switzer | B65G 65/4881 222/63 |
| 2,877,937 A * | 3/1959 | Weir | B65D 5/76 229/5.5 |
| 2,901,150 A * | 8/1959 | Matter | G01F 11/24 222/370 |
| 2,920,796 A | 1/1960 | Field | |
| 3,131,821 A | 5/1964 | Keiji | |
| 3,367,544 A | 2/1968 | Frank | |
| 3,450,310 A * | 6/1969 | Dayton | G01F 11/24 222/452 |
| 3,754,686 A | 8/1973 | Karlen | |
| 3,970,244 A | 7/1976 | Chatham | |
| 4,268,205 A | 5/1981 | Vacca | |
| 4,427,136 A | 1/1984 | MacKay | |
| 4,508,473 A | 4/1985 | Richter | |
| 4,511,067 A | 4/1985 | Martin | |
| 4,569,463 A | 2/1986 | Pellegrino | |
| 4,823,993 A | 4/1989 | Siegel | |
| RE33,083 E | 10/1989 | Pellegrino | |
| 4,892,233 A * | 1/1990 | Zelickson | B65D 83/06 141/144 |
| 4,957,219 A | 9/1990 | Robbins | |
| 5,109,893 A | 5/1992 | Derby | |
| 5,114,053 A | 5/1992 | Beirle | |
| 5,253,535 A | 10/1993 | McCown | |
| 5,303,672 A | 4/1994 | Morris | |
| 5,791,526 A * | 8/1998 | Landais | A47J 31/404 222/325 |
| 6,123,486 A * | 9/2000 | Wilms | B65D 88/68 406/67 |
| 6,237,816 B1 | 5/2001 | Boritzki | |
| 6,321,802 B1 * | 11/2001 | Weeks | F25C 5/24 141/351 |
| 6,779,691 B2 | 8/2004 | Cheng | |
| 7,090,098 B2 * | 8/2006 | Livingston | G01F 11/46 222/651 |
| 7,461,763 B1 | 12/2008 | Winn | |
| 7,874,457 B2 * | 1/2011 | Sowers | F25C 5/24 222/185.1 |
| 8,069,887 B2 * | 12/2011 | Dirnberger | F25C 5/24 141/205 |
| 11,089,894 B2 * | 8/2021 | Snediker | G01F 13/001 |
| 2003/0234264 A1 * | 12/2003 | Landau | A47G 19/34 222/368 |
| 2006/0027609 A1 * | 2/2006 | Landau | G01F 11/18 222/434 |
| 2006/0043115 A1 * | 3/2006 | Tanaka | B65G 65/46 222/181.1 |
| 2007/0138211 A1 | 6/2007 | O'Leary | |
| 2007/0187433 A1 * | 8/2007 | Webster | B65D 47/04 222/333 |
| 2010/0012684 A1 * | 1/2010 | Eaton | G01F 11/24 222/370 |
| 2010/0101401 A1 * | 4/2010 | Toeckes | F42B 12/44 89/1.51 |
| 2010/0320236 A1 | 12/2010 | Hassan | |
| 2014/0144926 A1 * | 5/2014 | Wolf | A47J 47/01 222/241 |

* cited by examiner

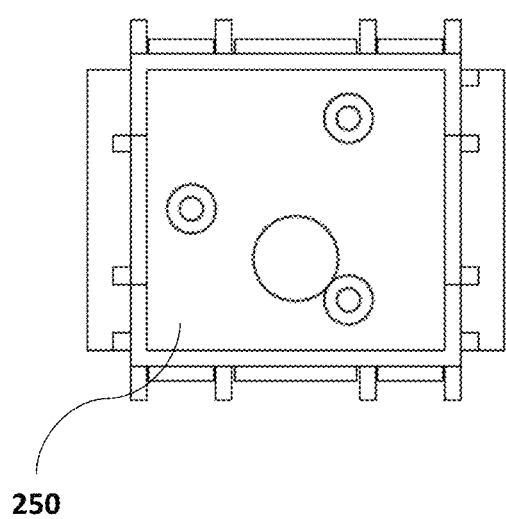
250  FIG. 10A
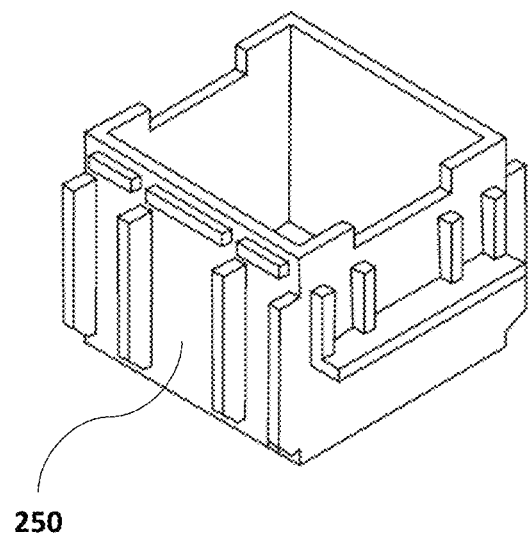
250  FIG. 10B
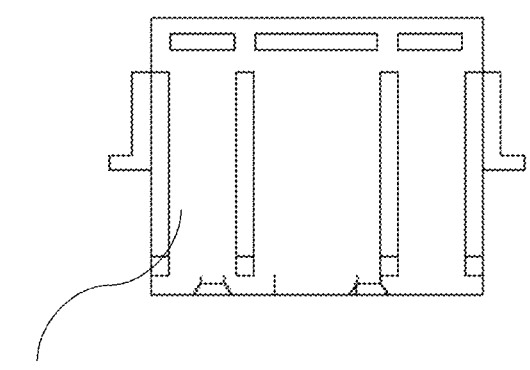
250  FIG. 10C
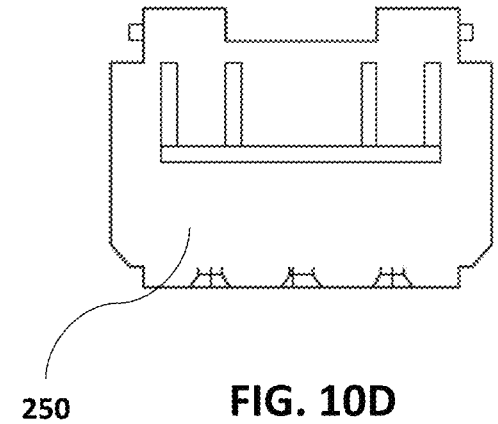
250  FIG. 10D

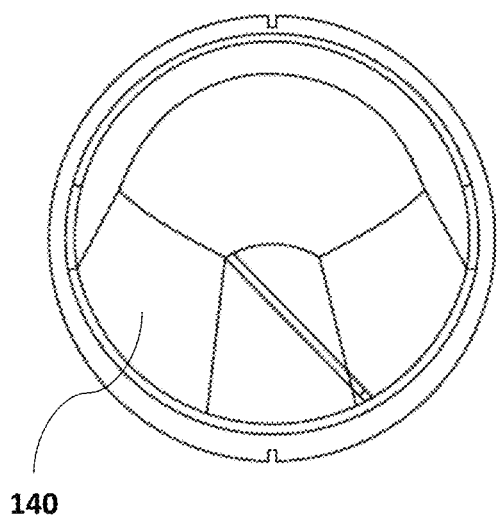
140
FIG. 11A
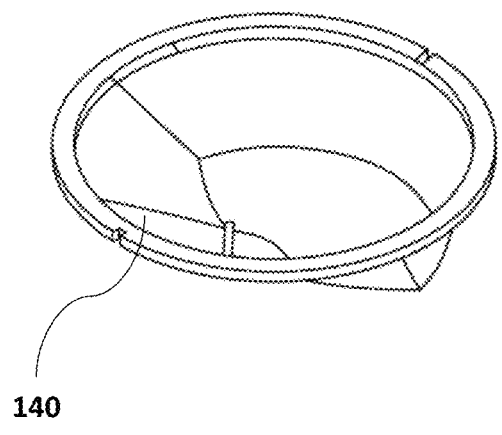
140
FIG. 11B
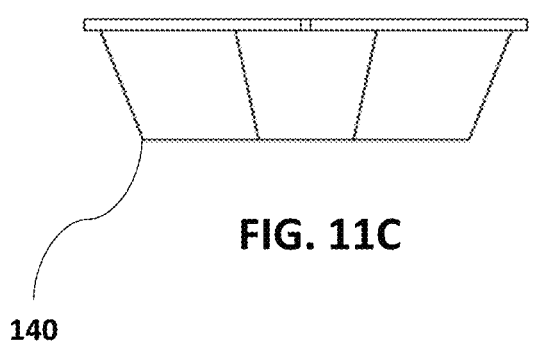
FIG. 11C
140
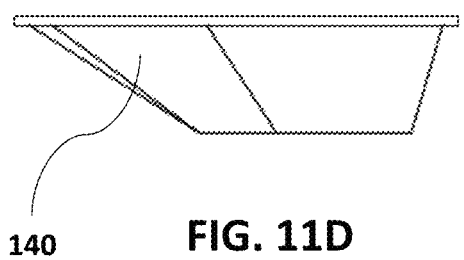
140  FIG. 11D

161

161

161

161

163

163

163

163

MOTORIZED DRY FOOD DISPENSING APPARATUS

CROSS-REFERENCE TO RELATED APPLICATIONS

This application is a continuation-in-part of U.S. patent application Ser. No. 16/746,163, filed on Jan. 17, 2020, which claims priority to U.S. Provisional Patent Application No. 62/794,095, filed on Jan. 18, 2019, all of which are incorporated herein by reference.

BACKGROUND

The present invention generally relates to bulk dispensers for comestibles, particularly to bulk dispensers for ready-to-eat cereals, and specifically to bulk dispensers for comestibles that minimize the generation of material fines due to material breakage and rough handling.

Conventionally, ready-to-eat cereal is often dispensed in bulk form at dormitories, hotels, and other commercial institutions from slide type dispensers. However, such dispensers dispense only one predetermined volume that could be too little or too much for the particular person or the bowl that he or she is using. Other alternative designs that continuously dispense dry foods dispense the food too fast and therefore create waste.

Alternatively, using a scoop to dispense dry foods is also undesirable as it increases the risk of contaminating the dry food remaining inside the storage container.

Other known dispensing systems such as those disclosed in U.S. Pat. Nos. 7,461,763 and 5,826,754 use a pivotal auger mechanism to dispense the dry food from an internal storage compartment. However, these auger systems tend to crush more delicate dry foods, such as flake type cereal.

SUMMARY OF THE INVENTION

The present invention provides a new motorized dry foods dispensing system for commercial, retail, and home use. This unique new invention differs in several ways from the prior art. In an embodiment of the invention described herein, a motor is engaged by depressing a lever located under a chute where the material is dispensed. The lever is depressed by lateral motion of the user's container. This enables users to operate the dispenser without touching or otherwise making contact with the machine, as well as preventing user fatigue resulting from having to turn a lever to dispense material. The motor engages for so long as the lever is depressed, allowing a user to dispense the exact amount of material they prefer.

In one aspect of certain embodiments of the invention, the system includes a unique set of interior baffles on a rotating feed wheel to ensure there is a controlled flow of material from a storage hopper through a dispensing chamber and eliminates bridging or damming of a material. Additionally, in certain embodiments of the invention, the lever actuates a motor which turns the rotating feed wheel to enable smooth controlled dispensing of material from the storage hopper into a user's container.

Sweeping protrusions operate with dispensing sections, a dispensing apparatus assembly 100, and a feed wheel to dispense dry food material without jamming or bridging in the dry food material.

In certain embodiments, the present invention is more compact in size in the dispensing area and therefore reduces the amount of space required on the counter than prior known dispensers.

BRIEF DESCRIPTION OF THE DRAWINGS

FIG. 10A shows a top view of a first side of a motor house of the embodiment of FIG. 1.

FIG. 10B shows a perspective view of the first side of FIG. 10A

FIG. 10C shows a front view of the first side of a motor house of FIG. 10A.

FIG. 10D shows a side view of the first side of a motor house of FIG. 10A.

FIG. 11A shows a top view of a funnel of the embodiment of FIG. 1.

FIG. 11B shows a perspective view of the funnel of FIG. 11A.

FIG. 11C shows a front view of the funnel of the embodiment of FIG. 11A.

FIG. 11D shows a side view of the funnel of the embodiment of FIG. 11A.

DETAILED DESCRIPTION

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

Figure 1:
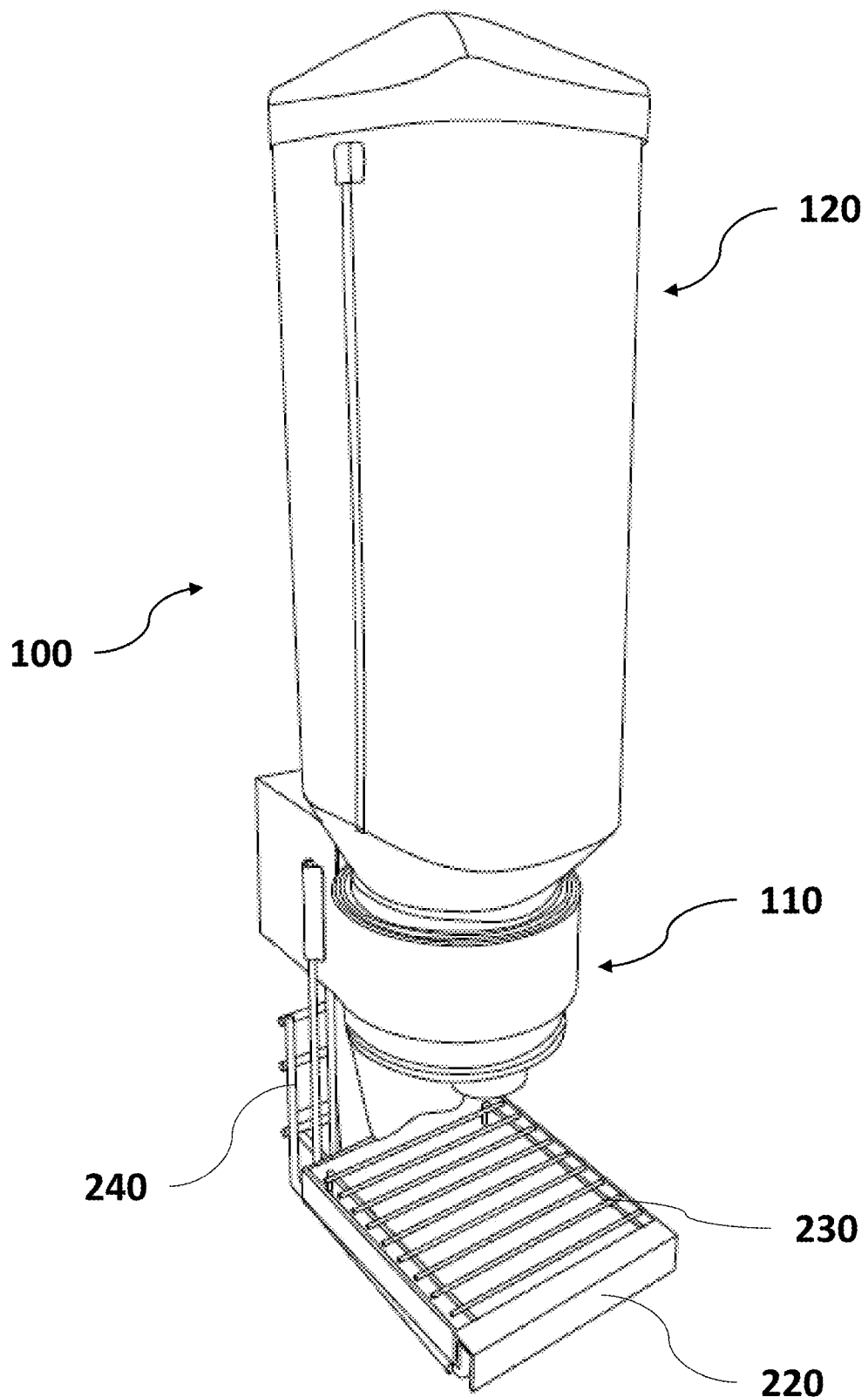
FIG. 1 shows a perspective view of an embodiment of the present invention.
Figure 2:
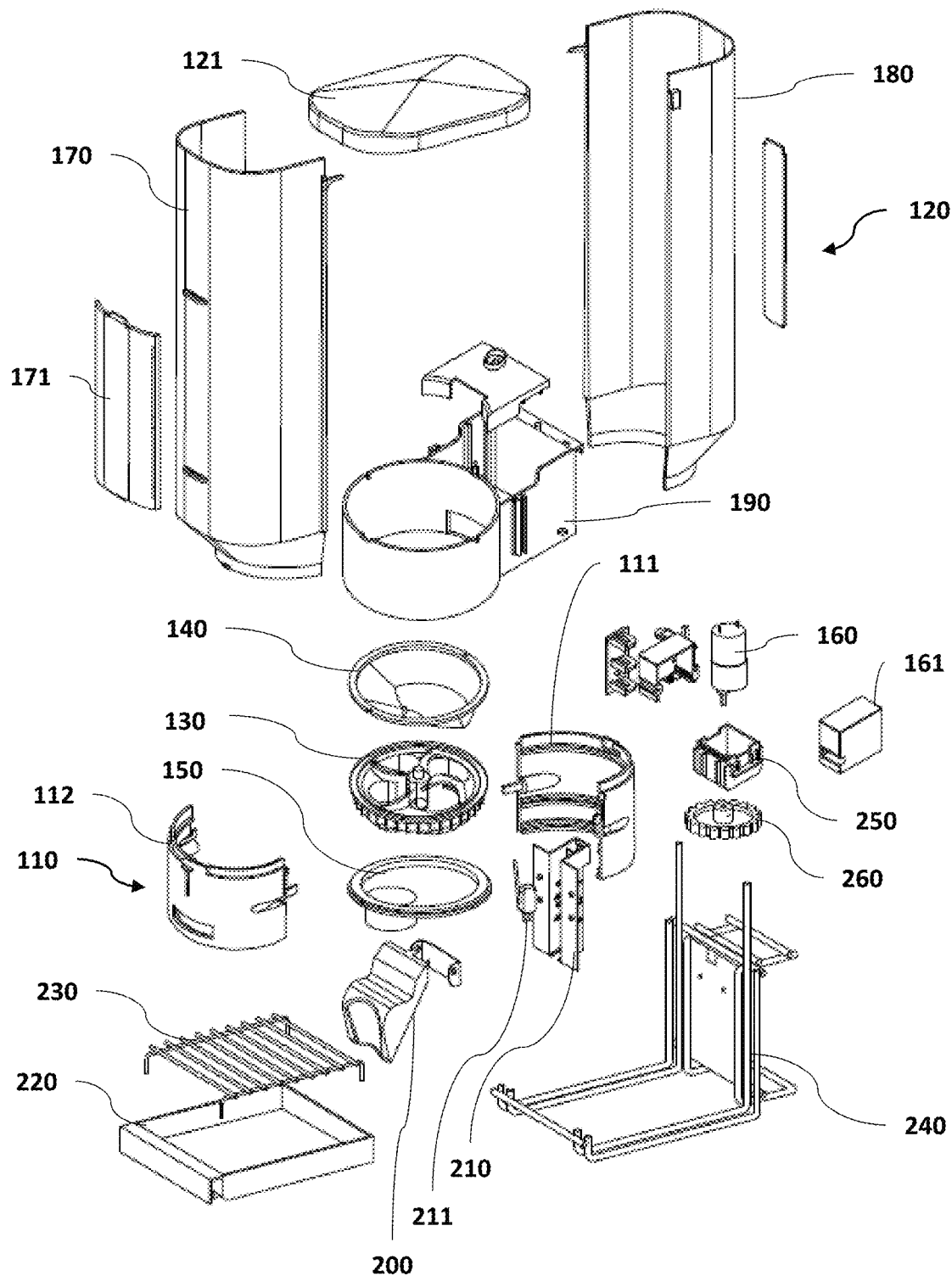
FIG. 2 shows an exploded view of the embodiment of FIG. 1.

Turning first to FIG. 1, an assembled view of a preferred embodiment of a dispensing apparatus assembly 100 is shown. A source container for storing material, shown as a hopper 120, is located above a feed house assembly 110. The hopper 120 contains a cavity in which the material is stored. Material stored in the hopper 120 is gravity fed from the hopper 120 to the feed house assembly in an illustrative embodiment. As shown in FIG. 2, in some embodiments, there is a funnel 140 internal to the feed house assembly 110 which directs material from the hopper 120 to a feed wheel 130. The feed wheel 130 rotates dispensing material into the user's container via a chute 150 located below the feed wheel.

FIG. 2 shows an exploded view of an embodiment of dispensing apparatus assembly 100. As shown in FIG. 2, the hopper 120 may be comprised of a first side 170 and a second side 180 mechanically connected to one another to form an upper storage portion to retain bulk solid material to be dispensed. Once the hopper 120 is filled with a material, for instance a cereal, the material is gravity fed through the hopper 120 to the funnel 140, which is located in the feed house assembly 110. The funnel 140 directs the material housed in the hopper 120 via gravity towards the feed wheel 130 in the feed house assembly 110. The feed wheel 130 is enclosed within two feed house collars 111-112. Below the feed wheel 130 is the chute 150 to direct the flow of the material swept with the feed wheel 130 to the opening in the chute 150. There is a removable cap 121 located atop the hopper 120 that allows the dispenser apparatus assembly 100 to be refilled, and prevent contamination of the material when it is full and in use.

Additionally, FIG. 2 shows a wire base 240 of a preferred embodiment which supports the hopper 120, a motor assembly 165, and a feed house assembly 110. The wire base 240 supports the hopper 120 and suspends it above a wire grate 230 and a removable crumb tray 220. In some embodiments, the wire grate 230 is designed to support the user's container as it is filled with material, such as cereal, while permitting excess material to fall through and be captured in the crumb tray 220. The crumb tray 220 thereby allows for quick cleaning of the area directly below the opening in the wire grate 230. Quick cleaning is facilitated by the removal of the wire grate 230 and crumb tray 220 from the wire base 240. Both the wire grate 230 and crumb tray 220 can be machine washed and are coupled mechanically to the wire base 240 to facilitate easy removal with no tools required.

Figure 5:
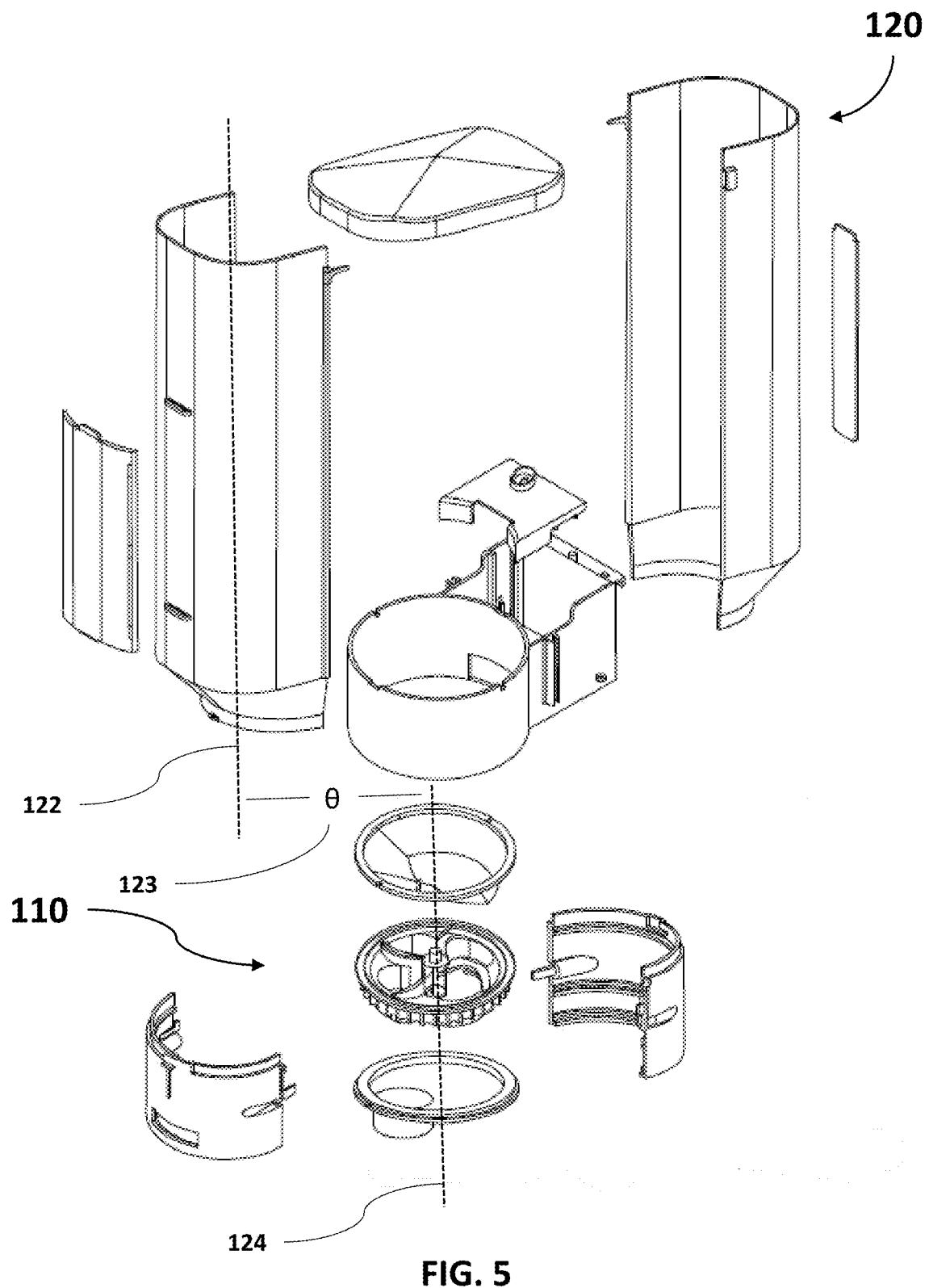
FIG. 5 shows an exploded view of a feed house assembly and a hopper assembly of the embodiment of FIG. 1.

In the embodiment shown in FIG. 5, it is noted that the axis 124 of the feed wheel 130 is substantially parallel to the axis 122 of the hopper 120. In some embodiments, material stored in the hopper 120 passes via gravity feed through the feed wheel 130, which portions and controls the flow of material, and into the chute 150 to be dispensed into the user's container. It is expressly contemplated that the angle of the axis 124 of the feed wheel 130 compared to the vertical axis 122 of the hopper need not be 0° as illustrated in FIG. 5. In at least some embodiments, this angle is an acute angle ranging from 0-89° depending on the embodiment.

Figure 3:
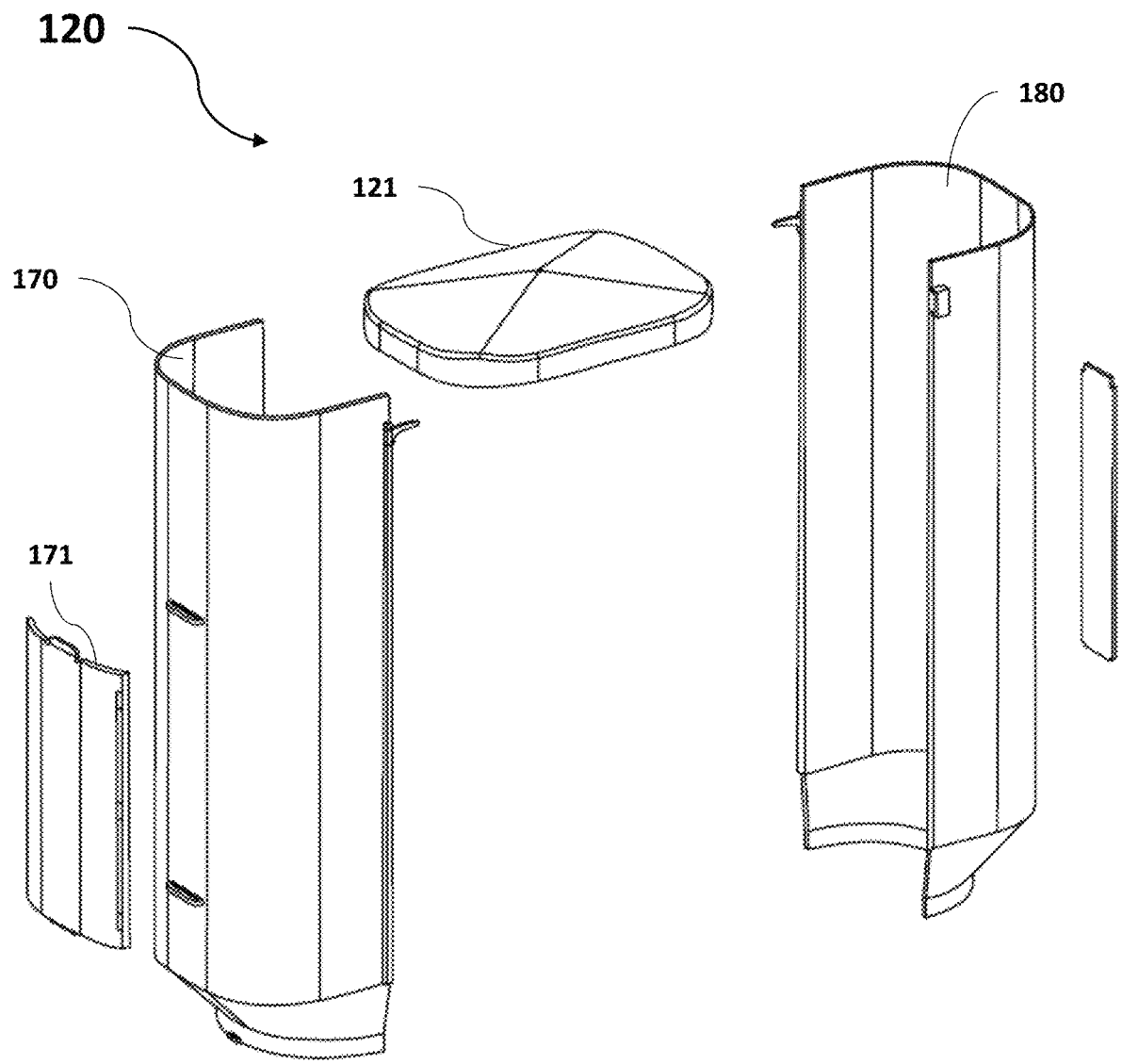
FIG. 3 shows an exploded view of a hopper assembly of the embodiment of FIG. 1.

Turning to FIG. 3, an exploded view of the hopper 120 is shown. As shown in FIG. 3, in some embodiments, there is a detachable plaque 171 attached to the first side 170 of the hopper 120 that allows the material's name and branding to be displayed for the user to see prior to depressing the lever 200 to engage the drive assembly 165.

Figure 4:
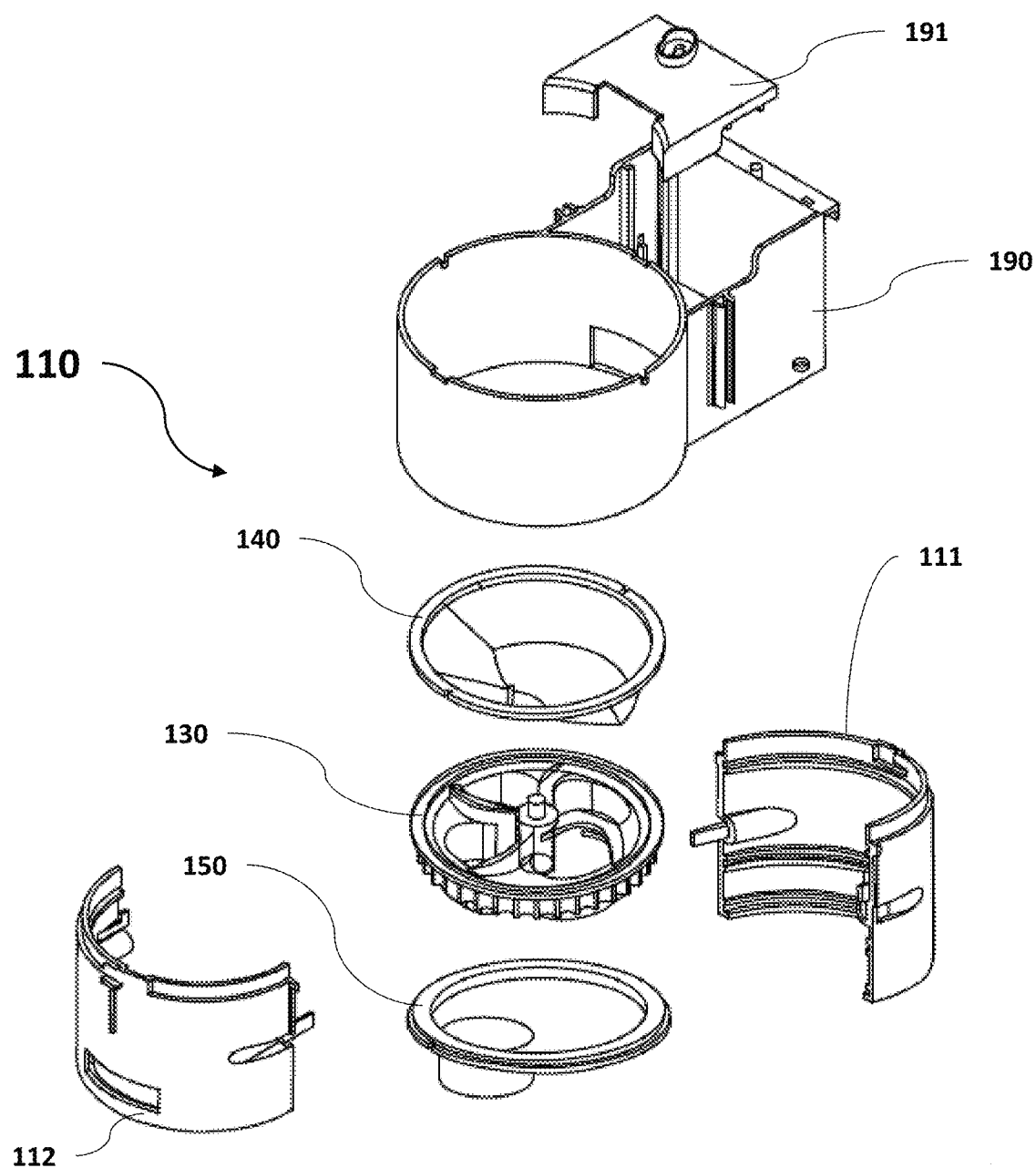
FIG. 4 shows an exploded view of a feed house assembly of the embodiment of FIG. 1.

FIG. 4 shows an exploded view of the feed house assembly 110. The feed house assembly 110 is located below the hopper 120, and houses funnel 140, feed wheel 130, and chute 150. Material that is stored in bulk in the hopper 120 passes through the funnel 140 and into the feed wheel 130. The feed wheel 130 has a ring of gear teeth that are acted on by the motor 160 to turn the feed wheel about a central axis (not shown in FIG. 4), to convey material from the hopper 120 into the chute 150. In certain embodiments, the chute 150 deposits the conveyed material into the user's container. The feed house assembly further comprises at least one or more collars 111-112 which retain the components of the feed house assembly 110 into a saddle 190. In a first embodiment, the saddle 191 holds all components of the feed house assembly 110 and is coupled to a base 240 and a hopper 120 (as previously described and shown in FIG. 1). The feed house assembly 110 additionally comprises a feed house cap 191 to further seal the feed house assembly 110 from the material in the hopper 120. FIGS. 7A-D show the feed house cap 191 in greater detail.

FIG. 5 shows the hopper 120, used in some embodiments, in a position relative to the feed house assembly 110. The hopper 120 is located upstream of the feed house assembly 110 to ensure smooth operation of the gravity fed system in some embodiments.

Figure 6:
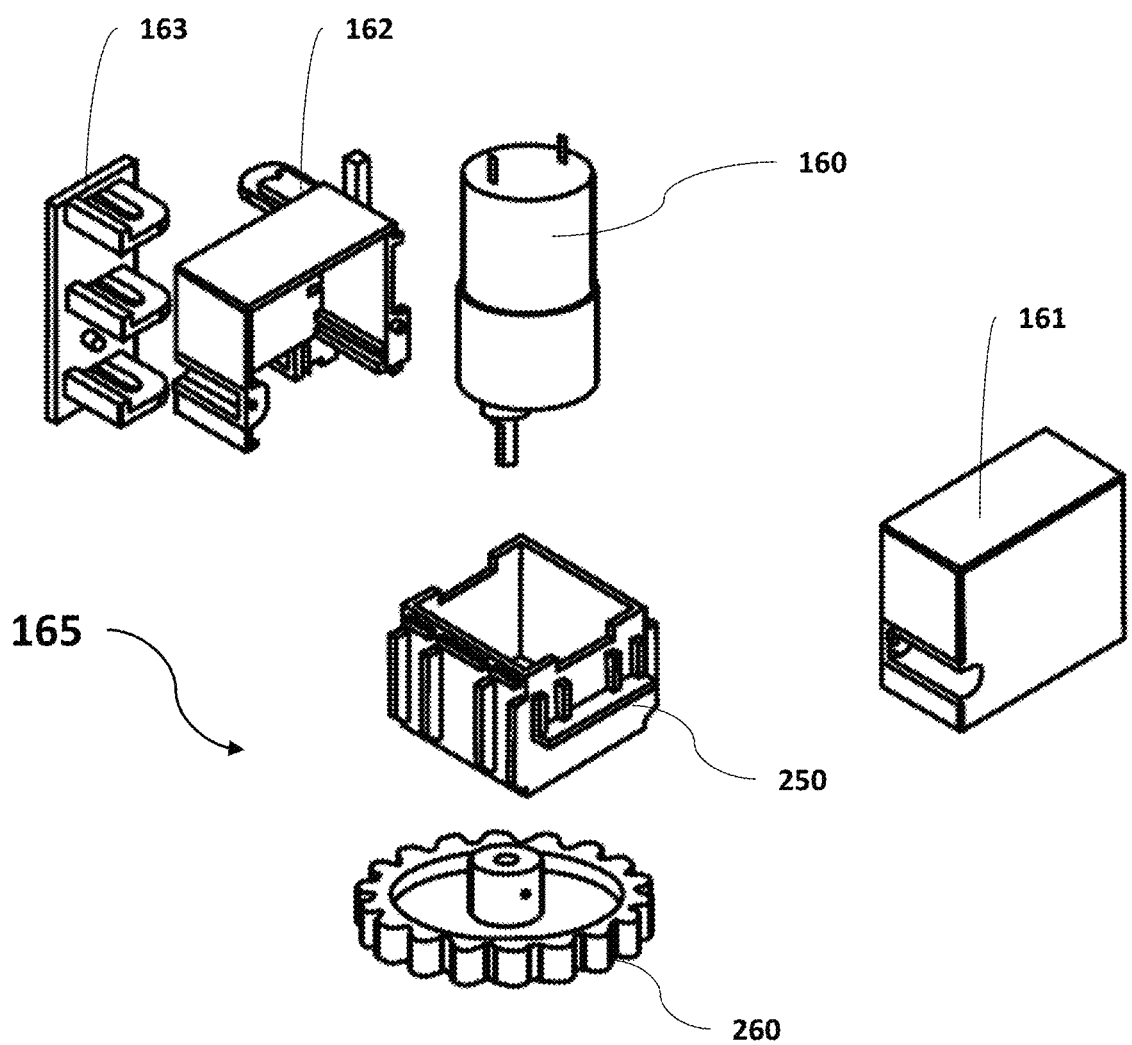
FIG. 6 shows an exploded view of a drive assembly of the embodiment of FIG. 1.
Figure 7A:
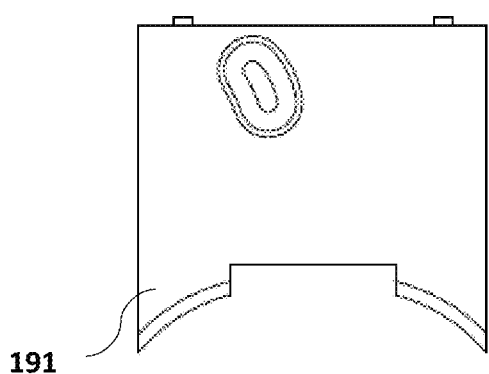
FIG. 7A shows a top view of a feed house cap of a the embodiment of FIG. 1.
Figure 7B:
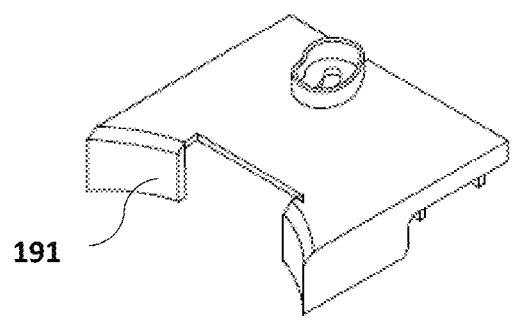
FIG. 7B shows a perspective view of the feed house cap of FIG. 7A.
Figure 7C:
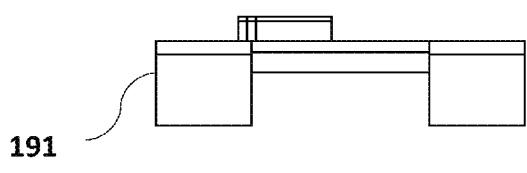
FIG. 7C shows a front view of the feed house cap of FIG. 7A.
Figure 7D:
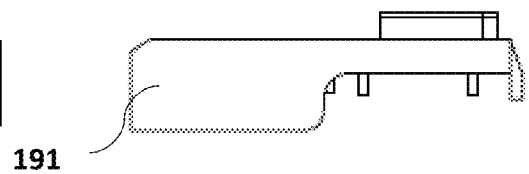
FIG. 7D shows a side view of the feed house cap of FIG. 7A.
Figure 8A:
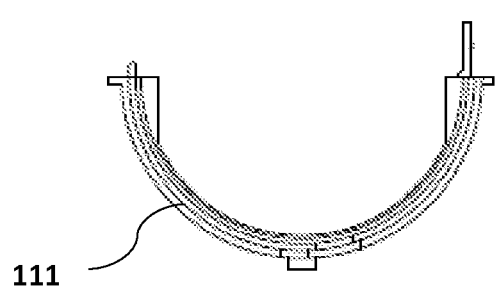
FIG. 8A shows a top view of a feed house collar of the embodiment of FIG. 1.
Figure 8B:
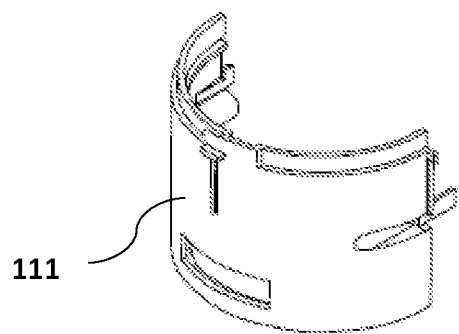
FIG. 8B shows a perspective view of the feed house collar of FIG. 8A.
Figure 8C:
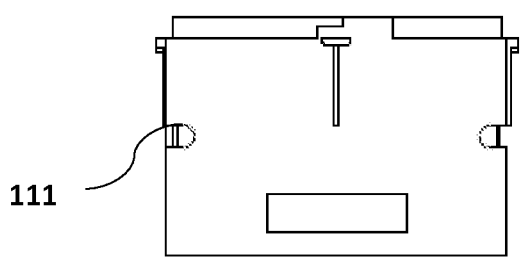
FIG. 8C shows a front view of the feed house collar of FIG. 8A.
Figure 8D:
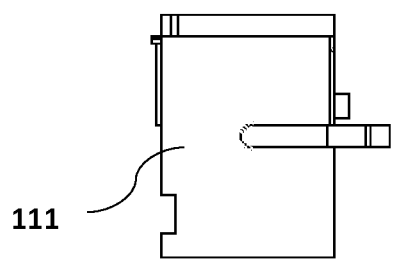
FIG. 8D shows a side view of the feed house collar of the embodiment of FIG. 8A
Figures 9A, 9B:
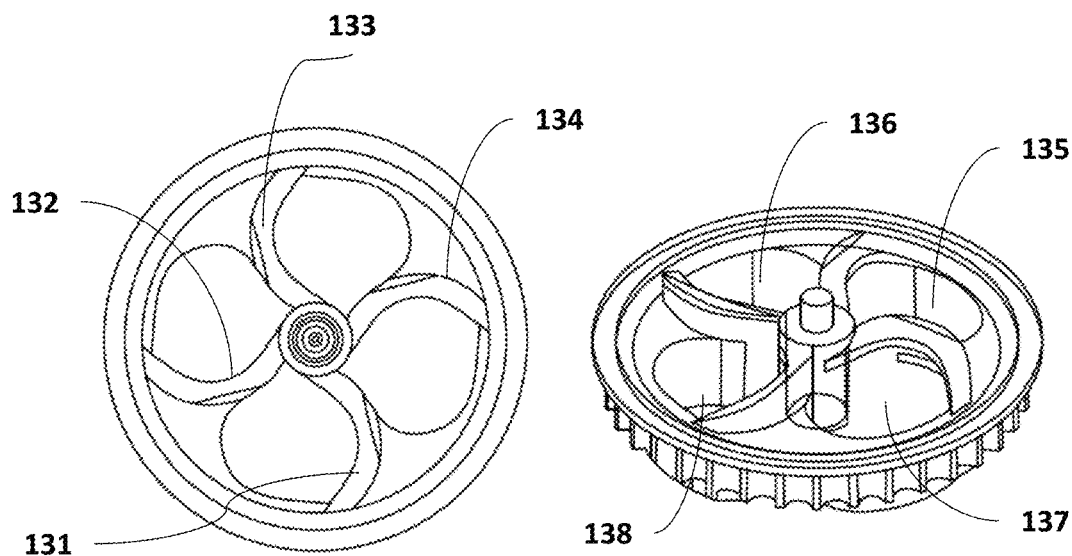
FIG. 9A shows a top view of a feed wheel of the embodiment of FIG. 1.
FIG. 9B shows a perspective view of the feed wheel of FIG. 9A.
Figures 9C, 9D:
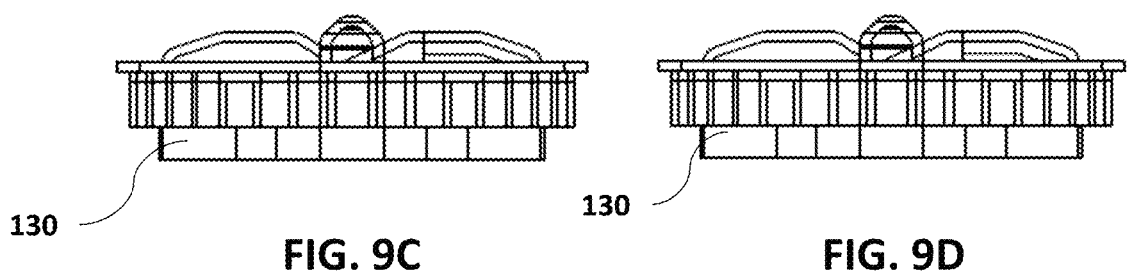
FIG. 9C shows a front view of the feed wheel of the embodiment of FIG. 9A.
FIG. 9D shows a side view of the feed wheel of the embodiment of FIG. 9A.
Figure 12A:
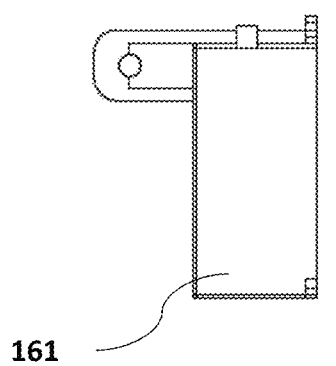
FIG. 12A shows a top view of a second side of a motor house of the embodiment of FIG. 1.
Figure 12B:
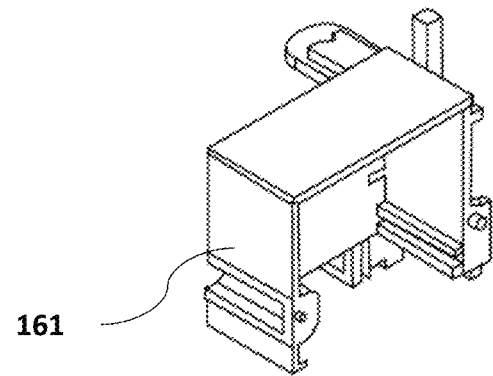
FIG. 12B shows a perspective view of the second side of a motor house of FIG. 12A.
Figure 12C:
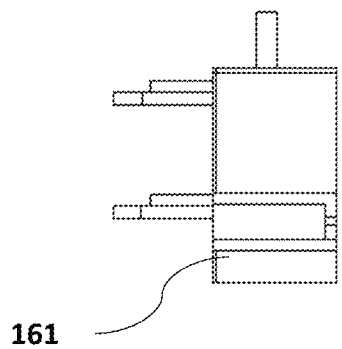
FIG. 12C shows a front view of the second side of a motor house of FIG. 12A.
Figure 12D:
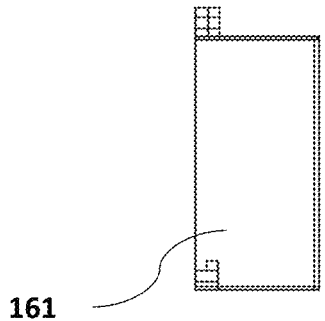
FIG. 12D shows a side view of the second side of a motor house of FIG. 12A.
Figure 13A:
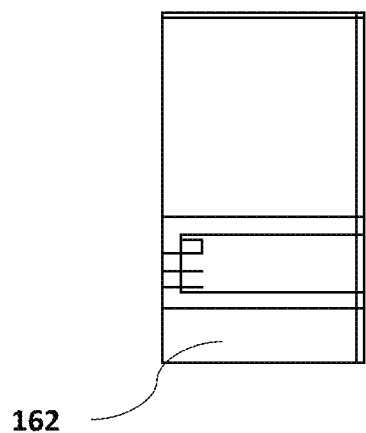
FIG. 13A shows a top view of a third side of a motor house of the embodiment of FIG. 1.
Figure 13B:
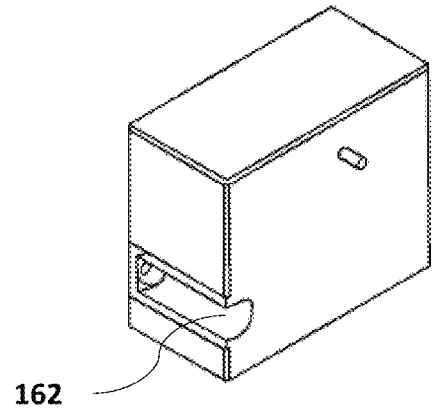
FIG. 13B shows a perspective view of the third side of a motor house of FIG. 13A.
Figure 13C:
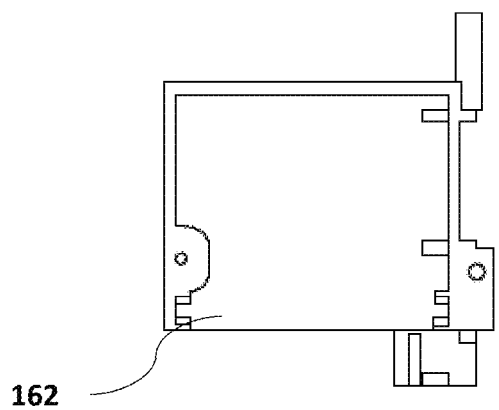
FIG. 13C shows a front view of the third side of a motor house of FIG. 13A.
Figure 13D:
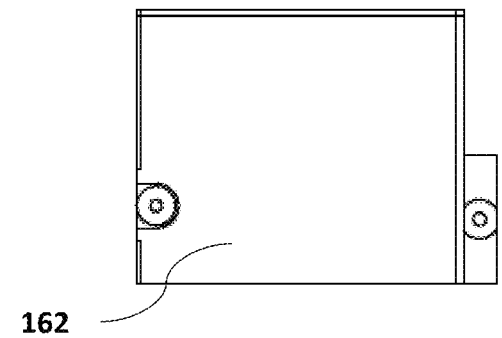
FIG. 13D shows a side view of the third side of a motor house of FIG. 13A.
Figure 14A:
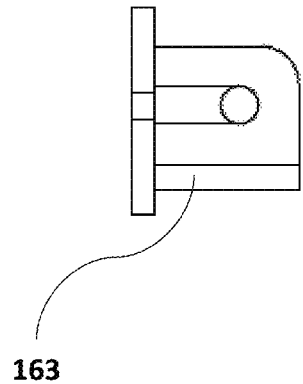
FIG. 14A shows a top view of a motor hinge of the embodiment of FIG. 1.
Figure 14B:
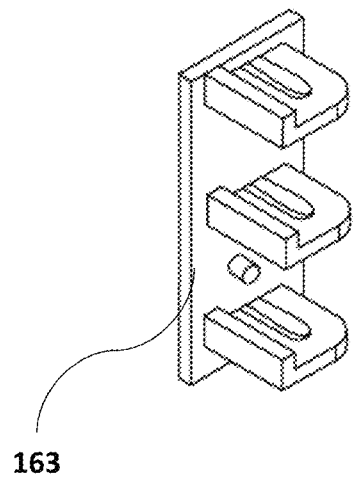
FIG. 14B shows a perspective view of the motor hinge of FIG. 14A.
Figure 14C:
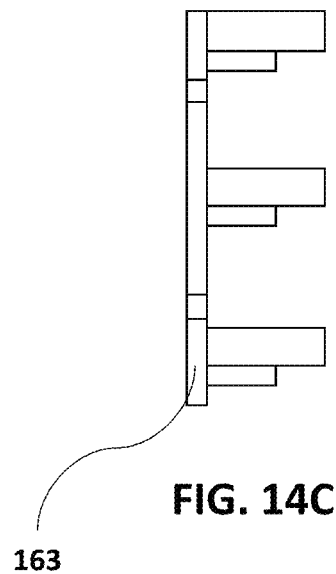
FIG. 14C shows a front view of the motor hinge of FIG. 14A.
Figure 14D:
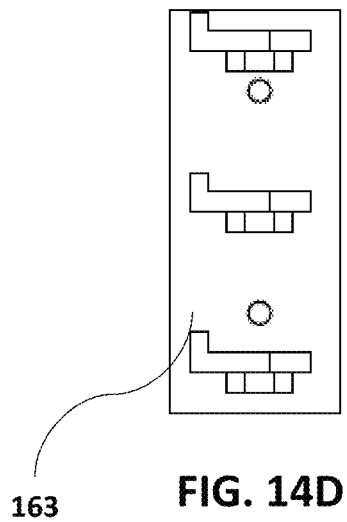
FIG. 14D shows a side view of the motor hinge of FIG. 14A.
Figure 15A:
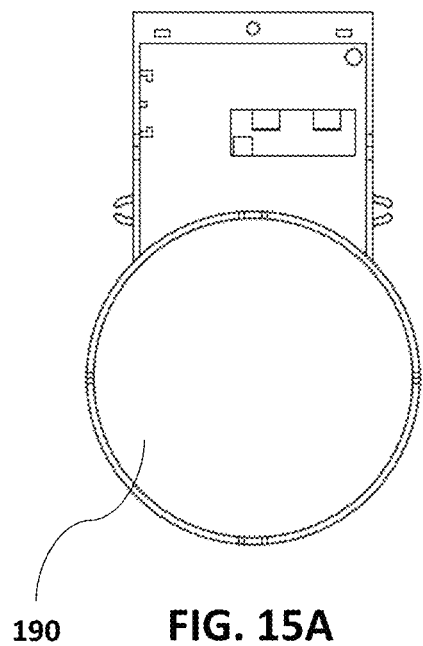
FIG. 15A shows a top view of a saddle of the embodiment of FIG. 1.
Figure 15B:
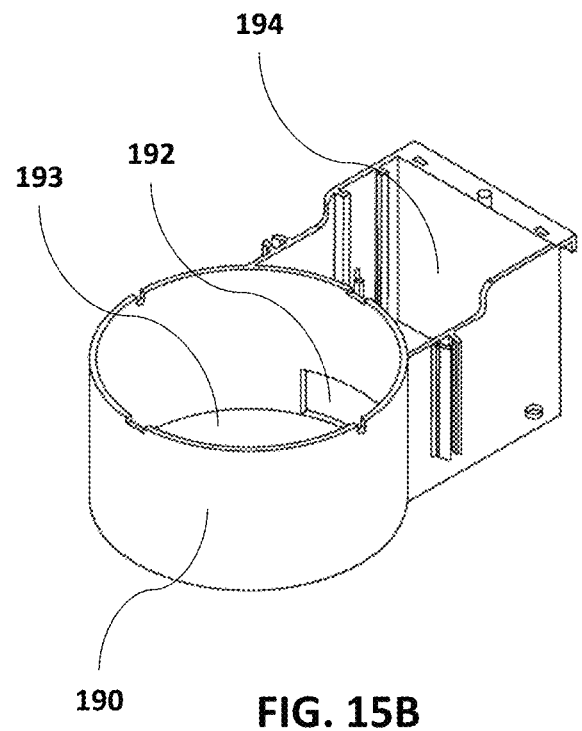
FIG. 15B shows a perspective view of the saddle of FIG. 15A.
Figure 15C:
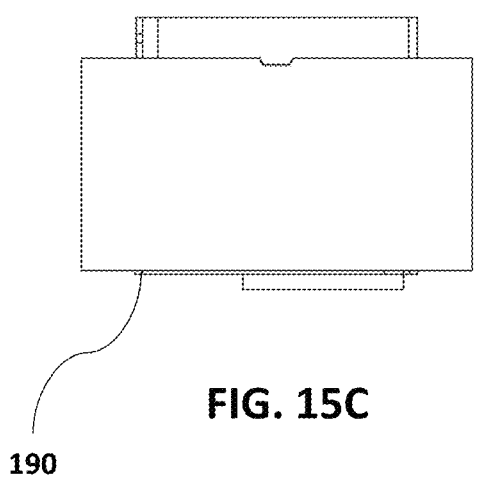
FIG. 15C shows a front view of the saddle of FIG. 15A.
Figure 15D:
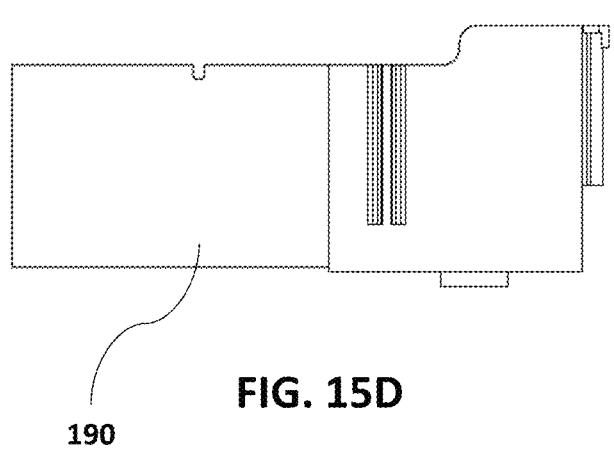
FIG. 15D shows a side view of the saddle of FIG. 15A.
Figure 16A:
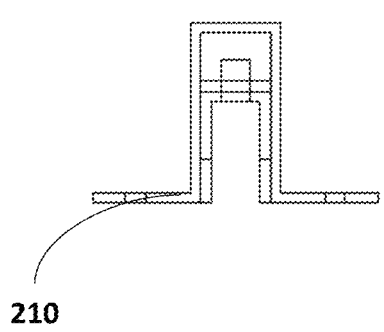
FIG. 16A shows a top view of a switch channel of the embodiment of FIG. 1.
Figure 16B:
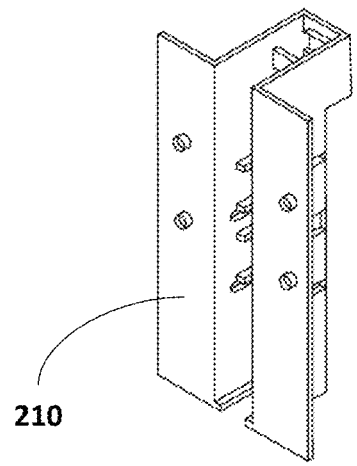
FIG. 16B shows a perspective view of the switch channel of FIG. 16A.
Figure 16C:
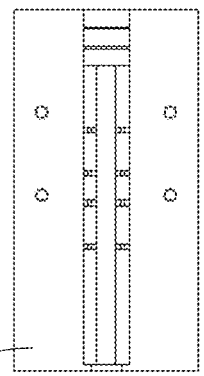
FIG. 16C shows a front view of the switch channel of FIG. 16A.
Figure 16D:
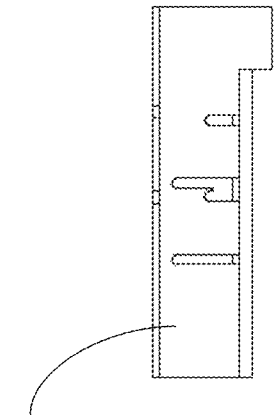
FIG. 16D shows a side view of the switch channel of FIG. 16A.

FIG. 6 shows a drive assembly 165. The drive assembly 165 is comprised of a motor 160, a first side of the motor housing 161, a second side of the motor housing 162, a third side of the motor housing 250, a cog 260, and a motor hinge 163. The motor 160 in some embodiments comprises a DC or AC, single or variable speed, motor.

FIGS. 10A-D show a first side of the motor housing 161 of an embodiment of the present invention. FIGS. 12A-D show a second side 162 of the motor housing of an embodiment of the present invention. FIGS. 13A-D show a third side of the motor housing 250 of a preferred embodiment of the present invention. The components of the motor housing are mechanically coupled during operation of the dispensing apparatus assembly 100 to provide a secure compartment containing the motor 160. This ensures the motor will not become agglomerated with any material or particulates that accumulate during operation. FIGS. 14A-D show the motor hinge 163, which is a support bracket located in the drive assembly 165 to support the motor 160. In some embodiments, the motor 160 is operatively coupled to a cog 260. The cog 260 has a plurality of protrusions around its circumference that engage with a plurality of protrusions around the circumference of the feed wheel 130 to drive the feed wheel.

FIGS. 8A-D show additional detail of feed house collar 111 of the feed house assembly 110 described above. The feed house assembly 110 is operatively constructed from a first collar 111 and a second collar 112 of molded plastic, however other materials may be used, including but not limited to polycarbonate or another similar thermoplastic plastic or metal. The funnel 140, feed wheel 130, and chute 150 (not shown in FIGS. 8A-8D) are housed inside of the first collar 111 and second collar 112.

FIGS. 9A-D shows additional detail of the feed wheel 130 described above. Each half of the feed wheel 130 contains four sweeping protrusions 131-134 and four dispensing sections 135-138 at one end of the sweeping protrusions 131-134. The sweeping protrusions 131-134 control the amount of the material conveyed and dispensed. Material first passes from the hopper 120 through the funnel 140 (not shown in FIGS. 9A-9D) and is swept into the dispensing sections 135-138 by the sweeping protrusions 131-134. The material then falls via gravity feed from the dispensing sections 135-138 through the chute 150 (not shown in FIGS. 9A-9D) into the user's container. The shape and dimensions of the sweeping protrusions 131-134 are in proportion to the feed house assembly 110 and control the amount of food to be dispensed at each rotation of the feed wheel 130.

In some embodiments, the feed wheel 130 is designed to prevent damming or clogging of the material as it is conveyed from the hopper 120 through the feed house assembly 110, and into the user's container. The sweeping protrusions 131-134 further act as baffles to prevent damming of material during operation of the dispensing apparatus assembly 100.

The feed wheel 130 is substantially vertically disposed about an axis 124 in the feed house assembly 110 as defined by the angle theta 123 (as shown in FIG. 5). In a preferred embodiment, the vertical disposition of the feed wheel reduces damming and agglomeration of material in the feed house assembly 110 and the hopper 120 because it allows direct gravity feed from the hopper 120 through the feed house assembly 110. This improves flow of material from the hopper 120, thereby reducing damming of the material.

The sweeping protrusions 131-134 on the feed wheel 130 further act as baffles to ensure smooth flow of material from the hopper 120 through the feed house assembly 110 because of the orientation of the feed wheel 130 as shown in this illustrative embodiment.

FIGS. 11A-C show the funnel 140 that channels material from the hopper 120 to the feed wheel 130 (as shown in FIG. 2). The funnel is located in the upper portion of the feed house assembly 110. The funnel 140 allows material to flow smoothly from the hopper 120 into the feed house assembly 110 without damming or agglomeration. Additionally, the funnel 140 works in conjunction with the feed wheel 130 to prevent the aforementioned damming or agglomeration of material in the hopper 120 or feed house assembly 110 ensuring material falls via gravity feed from the hopper 120 smoothly through the feed house 110 and into the users container via the chute 150. This is achieved by the funnel 140 being disposed in such a way that the material in the hopper 120 can fall via gravity fed directly into the feed wheel 130 without obstruction, thereby minimizing agglomeration or damming of the material.

FIGS. 15A-D show the saddle 190. As described above with reference to FIG. 4, the saddle houses the motor assembly 165 in a first part 194 and the feed house assembly 110 in a second part 193. There is a slot 192 between the first part 194 and the second part 193 of the saddle 190 that allows the cog 260 (described above and not shown in FIG. 15) on the motor 160 to make contact with the feed wheel 130. The motor actuates the feed wheel 130 when the lever 200 is depressed. The lever 200 (shown in FIG. 2) extends from the saddle 190 and is coupled to a paddle switch 211 (shown in FIG. 2) that actuates the motor when depressed. The saddle 190 also provides support to the hopper 120 when it is full of material.

In certain embodiments, the lever 200 is operatively coupled to a switch channel 210. FIGS. 16A-D show the switch channel 210. A paddle switch 211 is located inside the switch channel 210. When a container is pressed against the lever 200, the lever depresses and thus closes the paddle switch 211, which permits power to flow to the motor 160, thereby activating it. As previously described, the motor actuates the feed wheel 130. When the hopper 120 is filled with solid material, the solid material is directed to the feed wheel 130, which carries the solid material through the feed house assembly 110 and dispenses it through the chute 150. When the lever 200 is no longer depressed, the paddle switch 211 is opened and the motor 160 stops running.

Although in the embodiments disclosed here the dry food dispenser includes a hopper 120 as a container for the dry food, a person of ordinary skill in the art will appreciate that alternative structures for housing the dry food may be implemented without deviating from the invention. These alternative methods may include a direct feed from a larger container to the hopper 120. Additionally, it is expressly contemplated that the hopper 120 may comprise any number of shapes such as square, rectangular, circular, trapezoidal, or triangular.

One aspect of the present invention is that it is machine-washable and easy to take apart to clean. Materials suitable for machine washing are expressly contemplated for use as materials of construction for the present invention. Additionally, mechanical couplings such as detents are contemplated for use as fasteners because of the ease of assembly and disassembly for cleaning.

It is to be understood that the invention is not limited to the exact details of construction, operation, exact materials or embodiments shown and described, as obvious modifications and equivalents will be apparent to one skilled in the art. While the specific embodiments have been illustrated and described, numerous modifications come to mind without significantly departing from the spirit of the invention, and the scope of protection is only limited by the scope of the accompanying Claims.

What is claimed is:

1. A bulk food dispenser including:
   a source container for bulk food;
   a feed house assembly in communication with the source container;
   a funnel configured to direct the bulk food from the source container to the feed house assembly;
   a feed wheel with an axis substantially parallel to the axis of the source container, wherein the feed wheel further includes a plurality of protrusions configured to direct the bulk food out of the feed house assembly;
   an electrically actuated motor operatively coupled to the feed wheel;
   a switch coupled to a lever that actuates the motor,
   wherein the source container is comprised of two curved walls coupled mechanically to each other, and
   wherein the two curved walls coupled mechanically to each other further comprise semi-circular walls.

2. The bulk food dispenser of claim 1, wherein the feed wheel comprises four protrusions.

3. The bulk food dispenser of claim 2, wherein the feed wheel further comprises four openings.

4. The bulk food dispenser of claim 1, wherein the motor comprises a DC single speed motor.

5. The bulk food dispenser of claim 1, wherein the switch comprises a paddle switch.

6. The bulk food dispenser of claim 1, wherein the feed house assembly further comprises a chute configured to deliver bulk food from the feed house assembly to a container, at least one feed collar to seal the assembly and prevent crumbs from damaging the motor, and a saddle configured to support and encase the funnel, the feed wheel, the at least one collar, and the chute.

7. The bulk food dispenser of claim 6 wherein the saddle comprises a slot for a cog coupled to the motor to protrude from a motor encasement and engage the feed wheel.

8. The bulk food dispenser of claim 7 wherein the cog has a plurality of protrusions to engage the plurality of protrusions on the feed wheel.

9. The bulk food dispenser of claim 1, wherein the source container is a hopper located above the feed house assembly for containing the flowable bulk food.

10. The bulk food dispenser of claim 9, wherein the source container is coupled to a saddle.

11. The bulk food dispenser of claim 9, wherein the source container is substantially cylindrical.

12. A bulk breakfast cereal dispenser, comprising:
   a cavity defined by a source container;
   a funnel disposed at a base of the cavity configured to direct the flow of the flowable bulk breakfast cereal out of the storage container;
   a feed house comprising a mechanism for dispensing the flowable bulk breakfast cereal;
   a feed wheel comprising a plurality of openings configured to allow passage of breakfast cereal from the funnel, the openings adjacent a plurality of protrusions, wherein the feed wheel is electrically driven by a motor and the central axis of the feed wheel is substantially parallel to the axis of the storage container,
   a chute configured to direct the breakfast cereal from the feed wheel into a user's container disposed below the chute,
   wherein the source container is comprised of two curved walls coupled mechanically to each other, and
   wherein the two curved walls coupled mechanically to each other further comprise semi-circular walls.

13. The bulk breakfast cereal dispenser of claim 12, further comprising a lever disposed proximate the chute and operatively connected to the motor to cause the motor to turn on when the lever is depressed.

14. The bulk breakfast cereal dispenser of claim 12, wherein the protrusions extend upward from a top surface of the feed wheel to act on bulk food when the feed wheel is driven by the motor.

15. The bulk breakfast cereal dispenser of claim 12, wherein each of the protrusions is positioned adjacent one or more of the openings in the feed wheel.

16. A bulk food dispenser including:
   a source container for bulk food;
   a funnel configured to direct the bulk food from the source container towards a feed wheel with an axis substantially parallel to the axis of the source container, wherein the feed wheel further includes a plurality of protrusions configured to direct the bulk food through one or more openings in the feed wheel;
   an electrically actuated motor operatively coupled to the feed wheel; a switch coupled to a lever that actuates the motor, wherein closing the switch causes the bulk food to be dispensed through the one or more openings into the feed wheel and wherein opening the switch causes the flow of bulk food through the feed wheel to cease,
   wherein the source container is comprised of two curved walls coupled mechanically to each other, and
   wherein the two curved walls coupled mechanically to each other further comprise semi-circular walls.

* * * * *